Patented Apr. 30, 1940

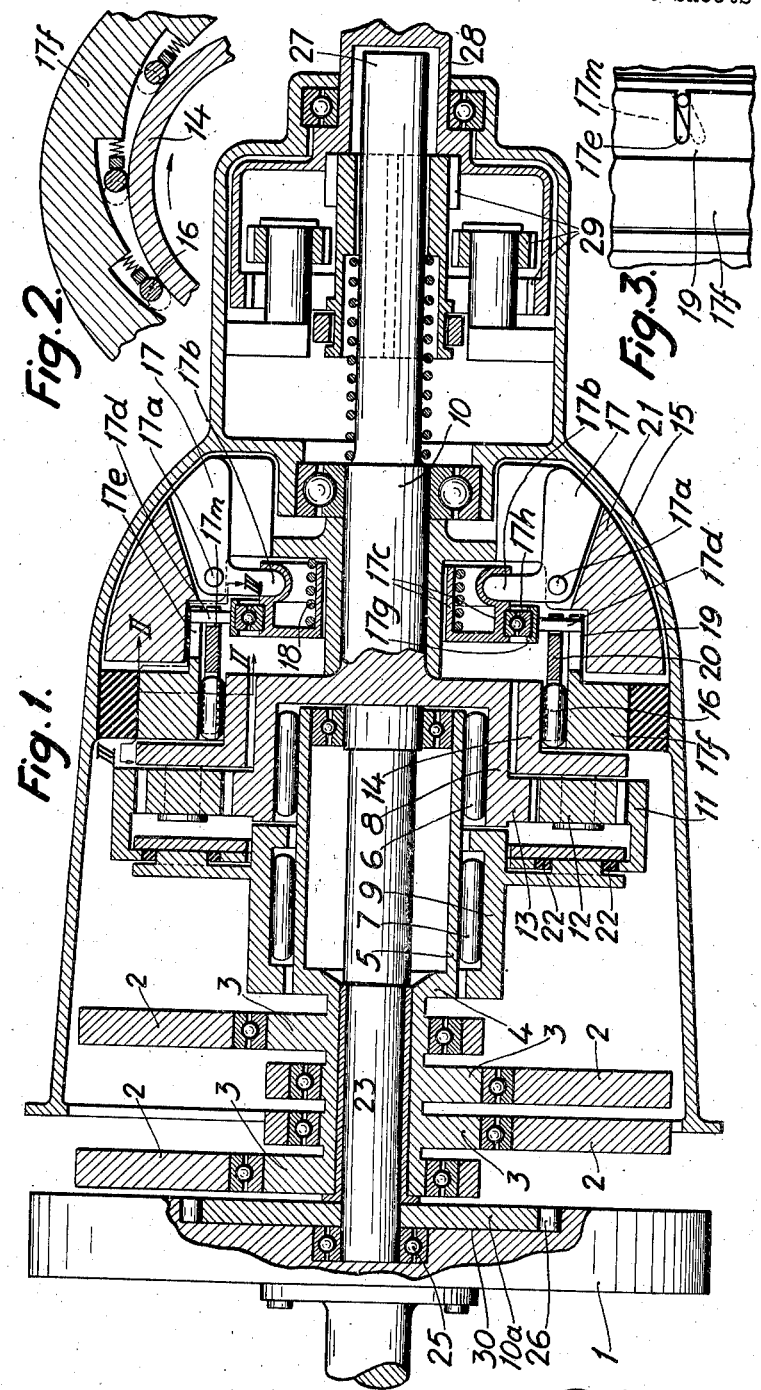

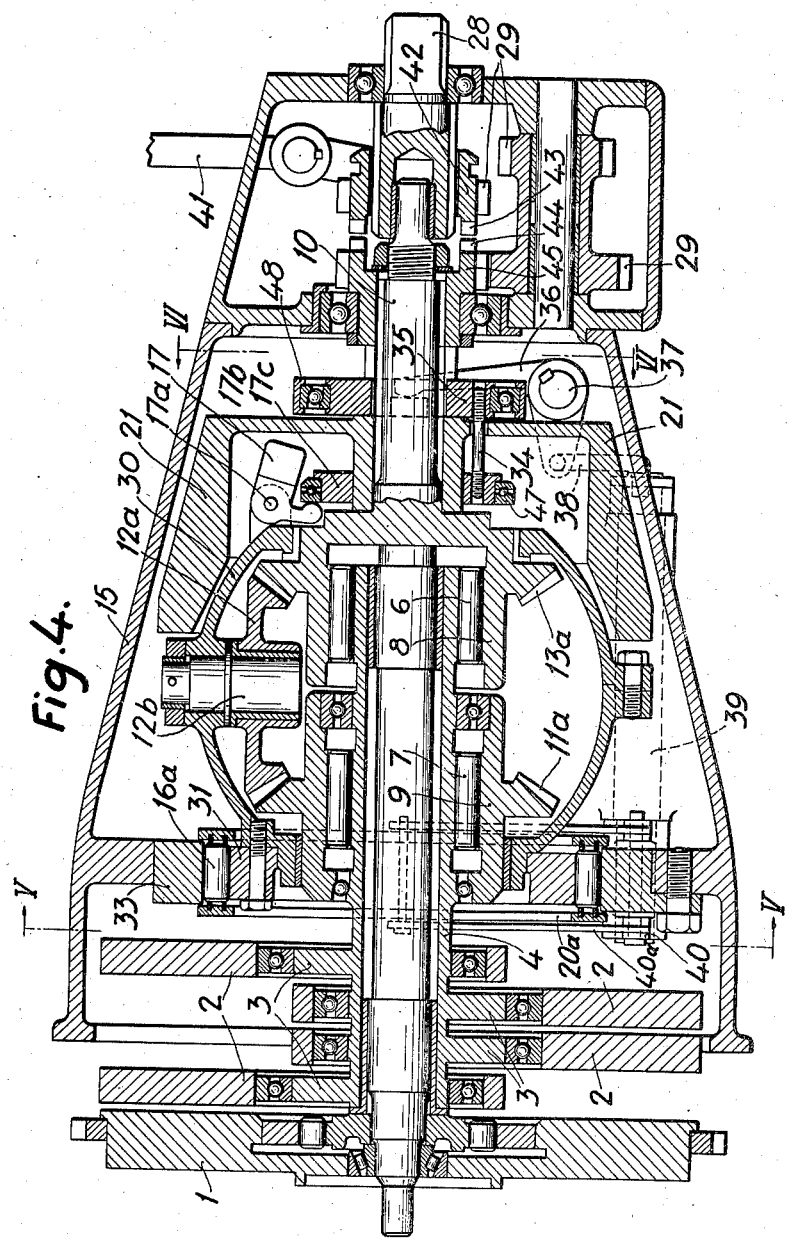

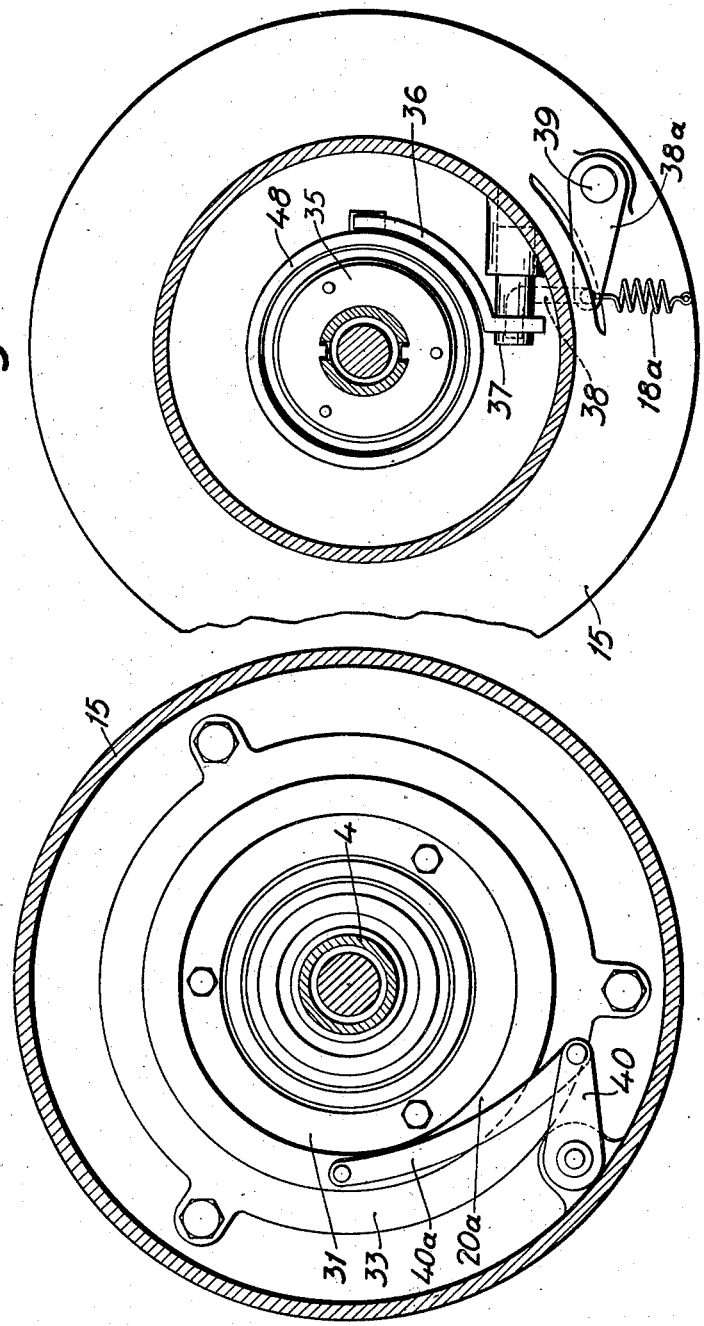

2,198,753

UNITED STATES PATENT OFFICE 2,198,753

AUTOMATICALLY VARIABLE CHANGE SPEED GEAR DEVICE

David Werner Berlin, Rasunda, Sweden

Application February 17, 1938, Serial No. 191,079
In Sweden February 27, 1937

10 Claims. (Cl. 74—260)

My present invention relates to automatically variable change speed gear devices of the type disclosed in my United States Patent No. 1,939,-100, and the invention relates to improvements and simplifications both as regards principle and construction, with a view to increasing the reliability of service, cheapening the manufacture and removing practically all disturbing sounds.

As known, this type of device works according to the centrifugal weight principle, positive and negative impulses during operation successively actuating the driven shaft with the cooperation of an eccentric sleeve, and a main feature of my invention consists in the improvement that checking means and transmission members for transmitting the negative as well as the positive impulses to the driven shaft are mounted round the outside of the eccentric sleeve.

By mounting the checking means in this manner the checking pressures are directed against the sleeve from outside and inwards, in which direction the strength of the construction is very considerable. Thus the weight of the eccentric sleeve may be reduced and the acceleration be improved in a high degree. Further, it is possible to provide in the same plane of rotation the checking means transmitting the impulses, which, both in respect of manufacture and mounting, is of a very great importance. The construction also admits of the possibility of mounting the eccentric sleeve in an essentially better manner than hitherto, which is of importance for obtaining a smooth and silent run. The checking sleeve of the driven shaft, which sleeve receives the positive impulses, encloses the outer portion of the eccentric sleeve, i. e., the portion, which is remote from the eccentrics, and the checking sleeve, which receives the negative impulses, encloses a portion of the eccentric sleeve, which is located nearer to the eccentrics. The members, which transmit the negative impulses from the checking sleeve, preferably consist of toothed wheels, of which certain intermediate wheels reverse the negative impulses and transmit them as positive impulses to the driven shaft. The said intermediate wheels are mounted on a body, which is checked against the outer casing at gearing run but moves freely at direct run in driving direction of motion. That member of the transmission members (the toothed wheels) which is connected with the checking sleeve for the negative impulse, is shock and sound insulated from the checking sleeve at certain points by means of intermediate members of a suitable elastic material, for example, synthetic rubber. Steel springs may, of course, also be used for the same purpose. In order to further reduce noise of the change speed gear device it is very suitable to shock and sound insulate in a similar manner the most primary part of the device, namely the eccentric sleeve. This may preferably be done in such a manner that the checking cylinder of the eccentric sleeve is made separately and is mounted at the eccentric portion and, between bars extending from respective parts, secured by blocks of synthetic rubber or fastened springs. In order to prevent the outer checking means, which fixes the annular sleeve, at which the intermediate wheels of the transmission gear for the negative impulse are mounted, from being worn out and causing overheating during direct run, the checking rollers, on changing to direct run, are moved out from their active position by means of a centrifugal governor, which is mounted in a fly-mass on the driven shaft. The checking means are provided with single-acting, spring-loaded checking rollers (i. e., they are active only in one direction of rotation). There is, however, nothing to prevent, in a more complicated construction, making said checking means reversible so as to reverse the rotation of the driven shaft. The members, which transmit the negative impulse, are so dimensioned that overgearing is produced between the eccentric sleeve and the driven shaft, which facilitates and accelerates the synchronizing of the negative impulse during its short period. When the checking means mentioned are single-acting the direction of motion of the gear is not reversible, due to which the change speed gear device must be combined with an ordinary toothed gear for reversing the motion of the driven shaft. In order to brake an automobile, provided with a gear device of this kind, with the motor, the driven shaft with one end, carrying the eccentric sleeve, is mounted in the fly-wheel of the motor, and is at this end provided with a checking device, which, when braking is effected by means of the motor, enters into function, which takes place as soon as the motor has the tendency to run at a lower speed than the Cardan shaft and begins to be driven by the latter.

Two embodiments of the invention are shown on the accompanying drawings.

Figures 1 and 4 show radial sections of each of the embodiments.

Figure 2 shows a partial section II—II in Fig. 1.

Figure 3 a partial section III—III, in Figure 1.

Figures 5 and 6 show cross sections V—V and VI—VI respectively, in Figure 4.

In the following, the embodiment according to Figures 1-3 will be described. Similar reference numerals in both embodiments refer to the same parts.

To the flywheel 1 of the motor there are linked the flyweights 2, which rotate around the eccentrics 3 on a sleeve 4. The outer portion 5 thereof, i. e., the portion remote from the eccentrics and the motor is cylindrical and forms the inner checking surface partly against the positive checking means, represented by rollers 6, and partly against the negative checking means, represented by rollers 7, with sleeves 8 and 9 forming the respective outer checking surfaces. The checking sleeve 8 is secured to the driven shaft 10, and the checking sleeve 9 is pivotally mounted on the eccentric sleeve. Between the checking sleeve 9, which transmits the negative impulses, and the driven shaft 10 there are transmission members, which transmit the negative impulses and reverse the same in positive direction. The said members consist partly of the primary toothed, cylindrical wheel 11, secured to the checking sleeve 9, partly of the intermediate, cylindrical wheels 12 and the secondary, cylindrical wheel 13, which is secured to the positive checking sleeve 8, which is connected with the driven shaft 10. The intermediate wheels 12 are mounted on an annular body 14, which in turn is mounted around the checking sleeve 8. Against the outer casing 15 there is checked the body 14 by means of checking means represented by rollers 16. Said rollers are controlled during direct run by a centrifugal governor, the swingable weights of which are indicated by 17. These weights are each mounted on a pivot 17a, which is secured in a flymass 21, into which the whole governor is built. Each of the flyweights have a driving arm 17b, engaging a sleeve 17c mounted concentrically with the shaft and movable along the same by means of the arms 17b. This sleeve is provided with pins 17d, which are movable in axial guide grooves 17e (Figure 3), provided in an annular part 17f rigidly connected with the casing 15, as well as in oblique grooves 17m in the roller holder 20. Between the sleeve and the part 17g, to which the pins 17d are fixed, there is a bearing, for example, a ball bearing 17h, in order to enable the sleeve to rotate in relation to the pins 17d. The grooves 17m are so shaped (Figure 3) that the roller holder is turned part way around its center in the shaft 10, when the pins 17d are moved in one direction or the other with the sleeve 17c. Depending upon the direction in which the roller holder is turned the rollers 16 are, during such operation, moved into or out of checking position. In the former position they are shown in dot lines, in the latter in full lines in Figure 2. At a certain speed of the driven shaft the weights 17 overcome the counterpressure of a spring 18, and displace the roller holder 20, in which case the checking rollers are moved by the roller holder 20 out of checking position as shown in dotted lines in Figure 2. On the drawings the weights 17 are shown when in a swung-out position, and, consequently, the rollers 16 are moved out of the checking position. When then the speed of the driven shaft again decreases to a certain value, the spring 18 again predominates, and the rollers are moved back into checking position. The primary toothed wheel 11 is connected with the checking sleeve 9 by means of annular or otherwise shaped intermediate members 22 of rubber, which receive the shocks in tangential direction at the impulse engagements. The eccentric sleeve 4 is mounted on the extension 23 of the driven shaft 10. The shaft 10 is mounted in the flywheel 1 for example by means of a ball bearing 25. For braking by means of the motor, checking means is provided in a cavity 30 of the fly-wheel 1, the said checking means being represented by rollers 26 and a disc 10a rotating with the shaft 10, as usual. The shaft 10 is cut off, at 27, and mounted in a part 28, from which the Cardan shaft extends. This provision has been made so as to provide for backward run with the backward run gears 29.

Figures 4, 5 and 6 illustrate how this invention can be applied to a change speed gear device having conical gear wheels instead of the cylindrical gear wheels 11, 12, 13 shown in the preceding embodiment. In the embodiment according to Figure 4 the flywheel 1 of the motor, the flyweights 2, the eccentrics 3 and the eccentric sleeve 4, and further, the positive checking sleeve 8 and the negative checking sleeve 9 are to be found. The two sleeves are each united or shaped as conical toothed wheels 13a and 11a corresponding to the cylindrical toothed wheels 13 and 11 in Figure 1. The two conical toothed wheels mesh with a transmission wheel 12a, which corresponds to the toothed wheel in Figure 1. The toothed wheel 12a is mounted on an axle 12b in a casing 30, which is concentric with the shaft 10 and has a checking ring 31 for cooperation with checking rollers 16a corresponding to the rollers 16 in Figure 1, i. e., the rollers 16a check in a certain position the casing 30 against the outer casing 15 via a checking ring 33 corresponding to the part 17f in Figure 1. The rollers 16a run in a roller holder 20a, which, like the roller holder 20, is shiftable for moving the rollers out of and into checking position, as described in connection with Figure 1. The device for shifting differs only constructively from the corresponding device in Figure 1. Thus, there is the centrifugal governor, the weights of which one, 17, appears in Figure 4. The pivot 17a for each flyweight is fastened in the flying mass 21. The ring 17c, which is actuated by the inner arm of the weight 17 when the weight is swung out, is united, for example, by means of one or more pins 34, with a ring 35, so that the same, by the action of the weights, is displaced along the shaft 10. During this operation an angle lever 36, which is turnably mounted on a pin 37 in the casing 15, is shifted. The said angle lever, via transmitting elements 38, 38a, 39, 40 and 40a (Figures 4-6) is united with the roller holder 20a so that the roller holder is shifted analogously with the roller holder 20 of Fig. 1 when the weights 17 are thrown towards the periphery. In order that there shall not arise any sliding friction against the arm 17b of the weight 17 the pressure of the arm is transmitted to the ring 17c via a ball bearing 47. Also around the ring 35 there is provided a ball bearing 48 via which the movement of the ring is transmitted to the angle lever 36. Like in the preceding embodiment a spring tends to return the ring 17c and other parts cooperating with the same to the initial position (the gearing run position) shown in Figure 4, in which position the rollers 16a hold the casing 30 checked against the casing 15. Said spring is embodied as a tension spring 18a (Fig. 6) which is fixed to the casing 15 and into the element 38a.

Also in this embodiment there is a back run gear 29. This gear is shifted by means of a lever 41 in a known manner, the said lever being turnably mounted in the casing 15 and in engagement with a coupling sleeve 42, which at its opposite end has teeth 43, adapted to mesh during forward run with teeth 44 on a sleeve 45 rotating with the shaft 10. On its circumference the sleeve 42 has teeth belonging to the backward run gear. By means of the lever 41 the sleeve 42 may be moved both to the left and to the right from the position shown in Figure 4, so as, in the former case, directly, and, in the latter case, via the backward run gear, to couple the Cardan shaft 28 with the sleeve 45.

Having now described my invention, what I claim as new and desire to secure by Letters Patent is:

1. An automatically variable change-speed device comprising a driving sleeve provided with eccentrics, flyweights mounted on the eccentrics, a negative checking sleeve surrounding the driving sleeve, clutch rollers positioned between said sleeves, a positive checking sleeve surrounding the driving sleeve, other clutch rollers positioned between the driving sleeve and the positive checking sleeve, gearing operatively connecting the negative checking sleeve to the positive checking sleeve, a rotatable member carrying a portion of said gearing, a stationary member cooperating with said rotatable member, brake rollers interposed between said members, a shaft driven by the positive checking sleeve, and means responsive to the rotation of the driven shaft and the resulting centrifugal force acting thereon for moving the last-mentioned rollers to a free position.

2. An automatically variable change-speed device comprising a driving sleeve provided with eccentrics, flyweights rotatably mounted on the eccentrics, a negative checking sleeve surrounding the driving sleeve, clutch rollers positioned between said sleeves, a positive checking sleeve surrounding the driving sleeve, other clutch rollers positioned between the driving sleeve and the positive checking sleeve, gearing operatively connecting the negative checking sleeve to the positive checking sleeve, an annular rotatable member carrying a portion of said gearing, a stationary annular member surrounding a portion of the rotatable annular member, brake rollers interposed between said annular members, a shaft driven by the positive checking sleeve, and means responsive to the rotation of the driven shaft and the resulting centrifugal force acting thereon for moving the last-mentioned rollers to a free position.

3. An automatically variable change-speed device as claimed in claim 1, in which a portion of the gearing is resiliently supported by the negative sleeve.

4. An automatically variable change-speed device comprising a driving sleeve provided with eccentrics, flyweights mounted on the eccentrics, a negative checking sleeve surrounding the driving sleeve, clutch rollers positioned between said sleeves, a positive checking sleeve surrounding the driving sleeve, other clutch rollers positioned between the driving sleeve and the positive checking sleeve, gearing operatively connecting the negative checking sleeve to the positive checking sleeve, a rotatable member carrying a portion of said gearing, a stationary member cooperating with said rotatable member, brake rollers interposed between said members, a shaft driven by the positive checking sleeve, and means responsive to the rotation of the driven shaft and the resulting centrifugal force acting thereon for moving the brake rollers to a free position, the last mentioned means comprising a structure moved by centrifugal force lengthwise of the driven shaft, a cage for the brake rollers, and a connection between said structure and said cage.

5. An automatically variable change-speed device comprising a driving sleeve provided with eccentrics, flyweights mounted on the eccentrics, a negative checking sleeve surrounding the driving sleeve, clutch rollers positioned between said sleeves, a positive checking sleeve surrounding the driving sleeve, other clutch rollers positioned between the driving sleeve and the positive checking sleeve, gearing operatively connecting the negative checking sleeve to the positive checking sleeve, a rotatable member carrying a portion of said gearing, a stationary member cooperating with said rotatable member, brake rollers interposed between said members, a shaft driven by the positive checking sleeve, means responsive to the rotation of the driven shaft and the resulting centrifugal force acting thereon for moving the brake rollers to a free position, a driving flywheel associated with the driving sleeve, and an extension of the driven shaft, extending through the driving sleeve and journalled in said flywheel.

6. An automatically variable change-speed device comprising a driving sleeve provided with eccentrics, flyweights mounted on the eccentrics, a negative checking sleeve surrounding the driving sleeve, clutch rollers positioned between said sleeves, a positive checking sleeve surrounding the driving sleeve, other clutch rollers positioned between the driving sleeve and the positive checking sleeve, gearing operatively connecting the negative checking sleeve to the positive checking sleeve, a rotatable member carrying a portion of said gearing, a stationary member cooperating with said rotatable member, brake rollers interposed between said members, a shaft driven by the positive checking sleeve, means responsive to the rotation of the driven shaft and the resulting centrifugal force acting thereon for moving the brake rollers to a free position, a driving flywheel associated with the driving sleeve, an extension for the driven shaft extending through the driving sleeve and into the flywheel, and a clutch operatively connecting said extension to the flywheel.

7. An automatically variable change-speed device comprising a driving sleeve provided with eccentrics, flyweights mounted on the eccentrics, a negative checking sleeve surrounding the driving sleeve and provided with a gear, clutch rollers positioned between said sleeves, a positive checking sleeve surrounding the driving sleeve and provided with a gear, other clutch rollers positioned between the driving sleeve and the positive checking sleeve, a rotatable casing surrounding said negative and positive checking sleeves, a rotatable gear carried by the casing and meshing with the gears of the negative and positive checking sleeves, a shaft driven by the positive checking sleeve, a rotatable member carried by said casing, a stationary member cooperating with said rotatable member, brake rollers interposed between said members, and means responsive to the rotation of the driven shaft and the resulting centrifugal force acting thereon for moving the brake rollers to a free position.

8. An automatically variable change-speed device comprising a driving sleeve provided with eccentrics, flyweights mounted on the eccentrics, a negative checking sleeve surrounding the driving sleeve and provided with a gear, clutch rollers positioned between said sleeves, a positive checking sleeve surrounding the driving sleeve and provided with a gear, other clutch rollers positioned between the driving sleeve and the positive checking sleeve, a rotatable casing surrounding said negative and positive checking sleeves, a rotatable gear carried by the casing and meshing with the gears of the negative and positive checking sleeves, a shaft driven by the positive checking sleeve, a rotatable member carried by said casing, a stationary member cooperating with said rotatable member, brake rollers interposed between said members, means responsive to the rotation of the driven shaft and the resulting centrifugal force acting thereon for moving the brake rollers to a free position, a driving flywheel operatively associated with the driving sleeve, and means including a clutch operatively connecting the driven shaft to the flywheel.

9. An automatically variable change-speed device comprising a driving sleeve provided with eccentrics, flyweights mounted on the eccentrics, a negative checking sleeve surrounding the driving sleeve, clutch rollers positioned between said sleeves, a positive checking sleeve surrounding the driving sleeve, other clutch rollers positioned between the driving sleeve and the positive checking sleeve, gearing operatively connecting the negative checking sleeve to the positive checking sleeve, a rotatable member carrying a portion of said gearing, a stationary member cooperating with said rotatable member, brake rollers interposed between said members, a shaft driven by the positive checking sleeve, and means responsive to the rotation of the driven shaft and the resulting centrifugal force acting thereon for moving the brake rollers to a free position, said negative checking sleeve being positioned closer to the eccentrics than the positive checking sleeve.

10. An automatically variable change-speed device comprising a driving sleeve provided with eccentrics, flyweights mounted on the eccentrics, a negative checking sleeve surrounding the driving sleeve, clutch rollers positioned between said sleeves, a positive checking sleeve surrounding the driving sleeve, other clutch rollers positioned between the driving sleeve and the positive checking sleeve, gearing operatively connecting the negative checking sleeve to the positive checking sleeve, a rotatable member carrying a portion of said gearing, a stationary member cooperating with said rotatable member, brake rollers interposed between said members, a shaft driven by the positive checking sleeve, means responsive to the rotation of the driven shaft and the resulting centrifugal force acting thereon for moving the brake rollers to a free position, a flywheel associated with the driving sleeve, an extension for the driven shaft extending through the driving sleeve and forming a fulcrum for the latter, and a clutch operatively connecting the extension to said flywheel.

DAVID WERNER BERLIN.